United States Patent
Tsuboi et al.

(10) Patent No.: US 6,671,410 B2
(45) Date of Patent: *Dec. 30, 2003

(54) IMAGE PROCESSING APPARATUS THAT CAN HAVE PICTURE QUALITY IMPROVED IN REPRODUCED ORIGINAL IMAGE DATA

(75) Inventors: Tomo Tsuboi, Toyokawa (JP); Kazuaki Nakamura, Toyohashi (JP); Shinji Yamamoto, Toyohashi (JP); Tetsuya Itoh, Okazaki (JP); Atsushi Ishikawa, Okazaki (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,364

(22) Filed: Mar. 20, 1998

(65) Prior Publication Data

US 2003/0190081 A1 Oct. 9, 2003

(30) Foreign Application Priority Data

Mar. 24, 1997 (JP) ............................................. 9-069935

(51) Int. Cl.[7] ................................................. G06K 9/36
(52) U.S. Cl. ....................... 382/234; 382/232; 382/239; 382/236
(58) Field of Search ................................. 382/234, 232, 382/239, 236, 249, 233, 266; 358/539; 348/417, 518; 250/214; 378/207

(56) References Cited

U.S. PATENT DOCUMENTS

| | | | | |
|---|---|---|---|---|
| 5,231,514 A | * | 7/1993 | Nakamura | 358/344 |
| 5,336,880 A | * | 8/1994 | Leclerc et al. | 378/207 |
| 5,761,341 A | * | 6/1998 | Go | 382/232 |
| 5,838,833 A | * | 11/1998 | Ishikawa et al. | 382/249 |
| 5,844,718 A | * | 12/1998 | Ohsawa et al. | 358/539 |
| 5,862,263 A | * | 1/1999 | Kim et al. | 382/249 |
| 5,862,264 A | * | 1/1999 | Ishikawa et al. | 382/249 |
| 5,870,502 A | * | 2/1999 | Bonneau et al. | 382/249 |
| 5,917,464 A | * | 6/1999 | Stearns | 345/87 |

FOREIGN PATENT DOCUMENTS

| | | | |
|---|---|---|---|
| JP | 7-141502 | 6/1995 | G06T/5/30 |
| JP | 7-160812 | 6/1995 | G06K/9/20 |
| JP | 7-199903 | 8/1995 | G09G/5/36 |
| JP | 8-223399 | 8/1996 | H04N/1/387 |

OTHER PUBLICATIONS

Lazar et al., "Fractal Block Coding of Digital Video," IEEE Transactions on Circuits and Systems for Video Technology, vol. 4, No. 3, pp. 297–308, Jun. 1994.*

Ida et al., "Image Segmentation Using Fractal Coding", IEEE Transactions on Circuits and Systems for Video Technology, vol. 5, No. 6, pp. 567–570, Dec. 1995.*

Jacquin, "Fractal Image Coding: A Review", Proceedings of the IEEE, vol. 81, No. 10, pp. 1451–1465 Oct. 1993.*

* cited by examiner

*Primary Examiner*—Anh Hong Do
(74) *Attorney, Agent, or Firm*—Burns, Doane, Swecker & Mathis, LLP

(57) ABSTRACT

An image processing apparatus includes a sort unit for sorting original image data into edge image data and planar image data, a first coding unit for coding the sorted planar image data according to the fractal block coding method, and a second coding unit for coding the sorted edge image data according to a coding method differing from the fractal block coding method. Thus, an image processing apparatus is provided that can have picture quality of a reproduced image improved even for a block that has maximum density difference such as an edge portion. The image processing apparatus can include a first coding unit for coding original image data according to the fractal block coding method, an extractor for extracting error between blocks, a comparator for comparing the amount of extracted error with a predetermined value, and a second coding unit for coding error information according to a coding method different from the fractal block coding method when the error amount is greater than the predetermined value as a result of comparison.

18 Claims, 11 Drawing Sheets

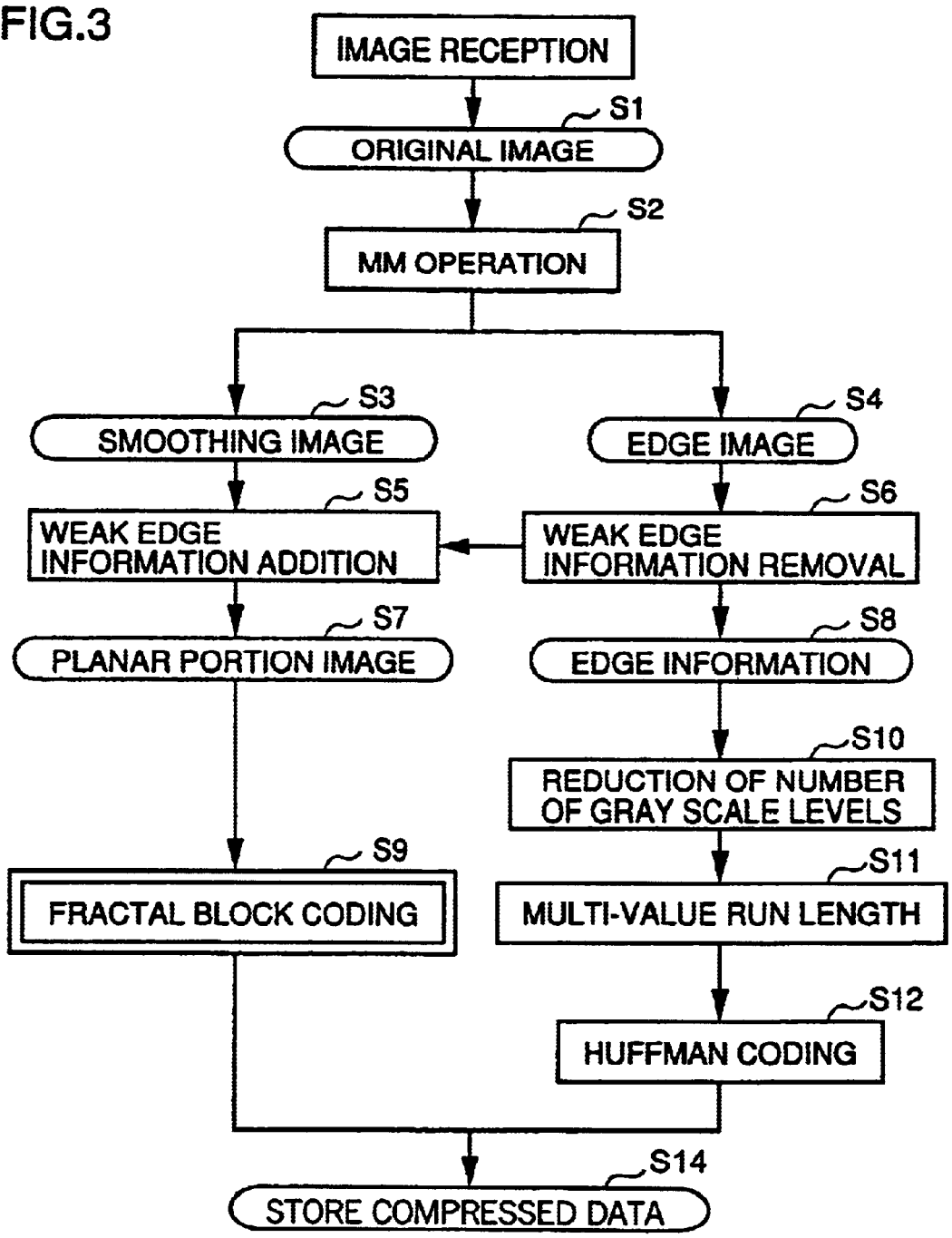

FIG.6
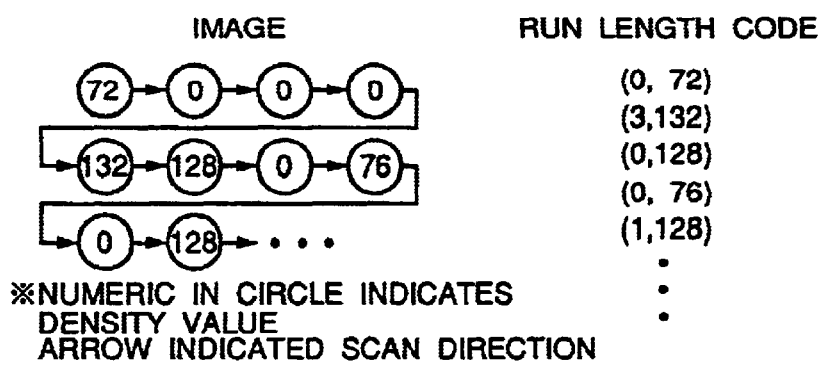
FIG.7
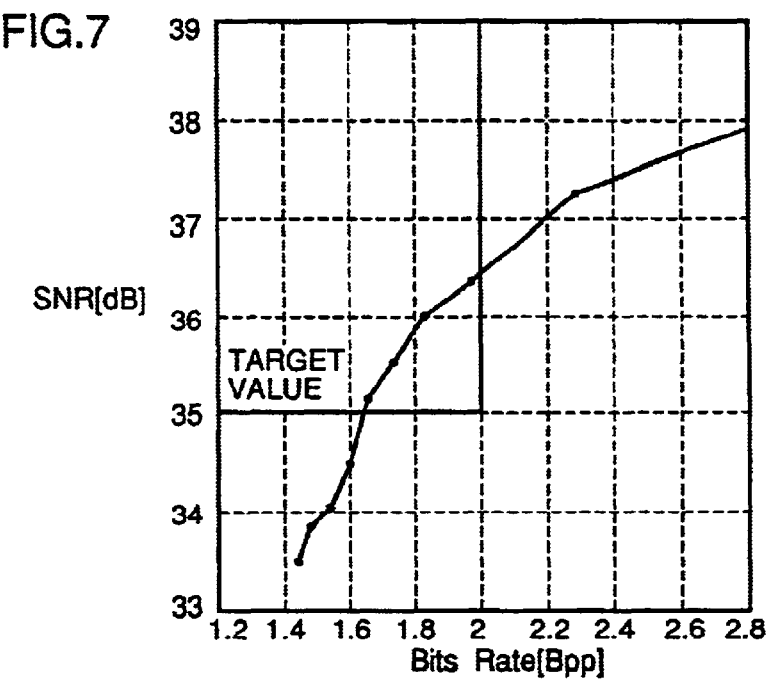
FIG.8
| 7.875POINT | 10.5POINT | 13.75POINT |

IMAGE PROCESSING APPARATUS THAT CAN HAVE PICTURE QUALITY IMPROVED IN REPRODUCED ORIGINAL IMAGE DATA

BACKGROUND OF THE INVENTION

1. Field of the Invention

The present invention relates to image processing apparatuses, and more particularly to an image processing apparatus employing fractal block coding.

2. Description of the Related Art

This application is based on Japanese Patent Application No. 9-069935 filed in Japan, the contents of which are hereby incorporated by reference.

The importance of image media has become higher as an image transmission system in accordance with the recent spread of image output devices and printers, as well as computer networks. Since image data have a significant amount of information, processing and transmission of the data in its original state is not efficient taking into consideration the capacity of the memory medium for storing data and the load on the transmission path.

Therefore, some efficient coding technique is generally applied. Research of various coding methods such as JPEG which is now in the standarization progress are carried out for the purpose of achieving a more efficient coding technique.

One noteworthy image compression method is the fractal block coding method by A. E. Jacquin. This method is based on the IFS (Iterated Function System) theory proposed by M. F. Barnsley. According to this method, an image is divided into a plurality of small blocks. Coding is effected by searching for partial self similarity with each block as the basic unit. More specifically, for one block of interest, a block that provides the optimum approximation is sequentially searched for from the entire image. The transformation matrix of the three dimensional reduction affine transformation that is applied at that time is recorded as the compressed data. At the time of reproduction, the recorded three-dimensional reduction affine transformation is iteratively applied on an arbitrary initial image repeatedly to obtain a reproduced image. This method is advantageous in that a high coding efficiency can be expected with respect to data of high self similarity. Furthermore, in contrast to the conventional compression method where data bias is included as redundancy, attention is focused on the fact that the image can be expanded to an arbitrary resolution at the reproduction stage in principle since the image is processed geometrically.

The conventional fractal block coding method will be described hereinafter. In this method, coding is carried out by substitution with the problem of searching for partial self similarity of which there is a density change that is extremely similar in the neighborhood of a portion of interest in an image having a certain density change.

First, the original image that is the subject of compression is divided into several small blocks (range blocks). A region (domain block) having a density change that is similar to that of the range block of interest is searched for in a sequential manner for respective range blocks while applying the reduction transformation shown in FIG. 1. More specifically, the range block is approximated by an approximation block that has a domain block D subjected to a three-dimensional reduction affine transformation. The three-dimensional reduction affine transformation includes three types of transformations of: area reduction transformation on the plane of the image definition coordinates; pixel allocation transformation (affine transformation); and density transformation (FIG. 2). The pixel allocation transformation includes the total of eight transformations of rotational transform for every 90 degrees and respective mirror image transformation. The density transformation includes the scale transformation for matching the range of the maximum and minimum values of the density value and the shift transformation for matching the average density value. Mean square error is employed as a barometer for measuring the approximation. This is represented by the following equation (1), where f(x, y) is the density value of range block R and g(x, y) is the density value of an approximation block D'.

$$MSE = \frac{1}{b^2} \sum_{(x,y) \in B} (f(x, y) - g(x, y))^2 \qquad (1)$$

Determination is made that the optimum approximation is achieved when the mean square error MSE is minimum. Thus, for a range block R of interest, coding is effected with the position of a domain block D achieving the optimum approximation and the transformation matrix of the three-dimensional reduction affine transformation as compressed data.

In other conventional compression methods, the original image is transformed into a coordinate system having a bias statically, and then the bias thereof is included as the redundancy. However, the fractal image compression method is different. Attention is focused on the fractal image compression method as a new method of removing the geometrical structural redundancy on the image plane. Since transformation on the image plane is carried out using compressed data, expansion is allowed at one time in reproduction by preparing the initial image of a desired resolution at the time of reproduction.

However, fractal image compression is disadvantageous in that the computation for searching for an approximation region of each block in the compression stage is extremely time-consuming. Furthermore, block distortion due to the block-by-block basis and distortion in blocks having a sudden density change such as the edge portion where an approximation block that provides sufficient approximation is not found are conveyed to the entire image at the time of reproduction, so that the picture quality of the reproduced image is degraded. It can be said that the picture quality of the reproduced image has not yet achieved an acceptable level for practical usage.

In fractal coding, the picture quality of the reproduced image is degraded at the region exhibiting severe density change such as at the edge portion in an image. The density transformation (scale transformation and shift transformation) carried out when a range block is approximated with a domain block is defined as shown in FIG. 2 for fractal coding. Since scale transformation is a reduction transformation for matching the maximum and minimum width of the density value of these two blocks, the condition of the following equation (2) must be satisfied between range block R and domain block D.

Density difference ΔR of range block ≦ density difference ΔD of domain block     (2)

The domain blocks that become the candidates for approximation is limited for the range block having the maximum density difference. The possibility that sufficient approximation is not carried out is high. Thus, degradation easily occurs.

SUMMARY OF THE INVENTION

In view of the foregoing, an object of the present invention is to provide an image processing apparatus that can have picture quality improved in reproducing original image data.

Another object of the present invention is to improve picture quality in reproducing original image data in an image processing apparatus that carries out coding by a fractal block coding method.

A further object of the present invention is to carry out coding according to original image data in an image processing apparatus that carries out coding by a fractal block coding method.

The above objects are achieved by an image processing apparatus set forth in the following.

According to an aspect of the present invention, an image processing apparatus includes a unit for sorting original image data into edge image data and planar image data, a first coder for coding the planar image data sorted by the sort unit according to a fractal block coding method, and a second coder for coding the edge image data sorted by the sort unit according to a coding method different from the fractal block coding method.

The original image has the planar portion image of small density change that is suitable for fractal block coding compressed using the fractal block coding method, and the edge portion image that is not suitable for the fractal block coding method compressed using another coding method. Therefore, the picture quality in reproducing the original image data can be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing the processing contents of an image processing apparatus according to a first embodiment of the present invention.

FIG. 6 shows multi-run length coding.

FIG. 7 shows compression efficiency and reproduced picture quality of a natural image indicating the advantage of the first embodiment of the present invention.

FIG. 8 shows an original image used in experiments.

DESCRIPTION OF THE PREFERRED EMBODIMENTS

Figure 1:
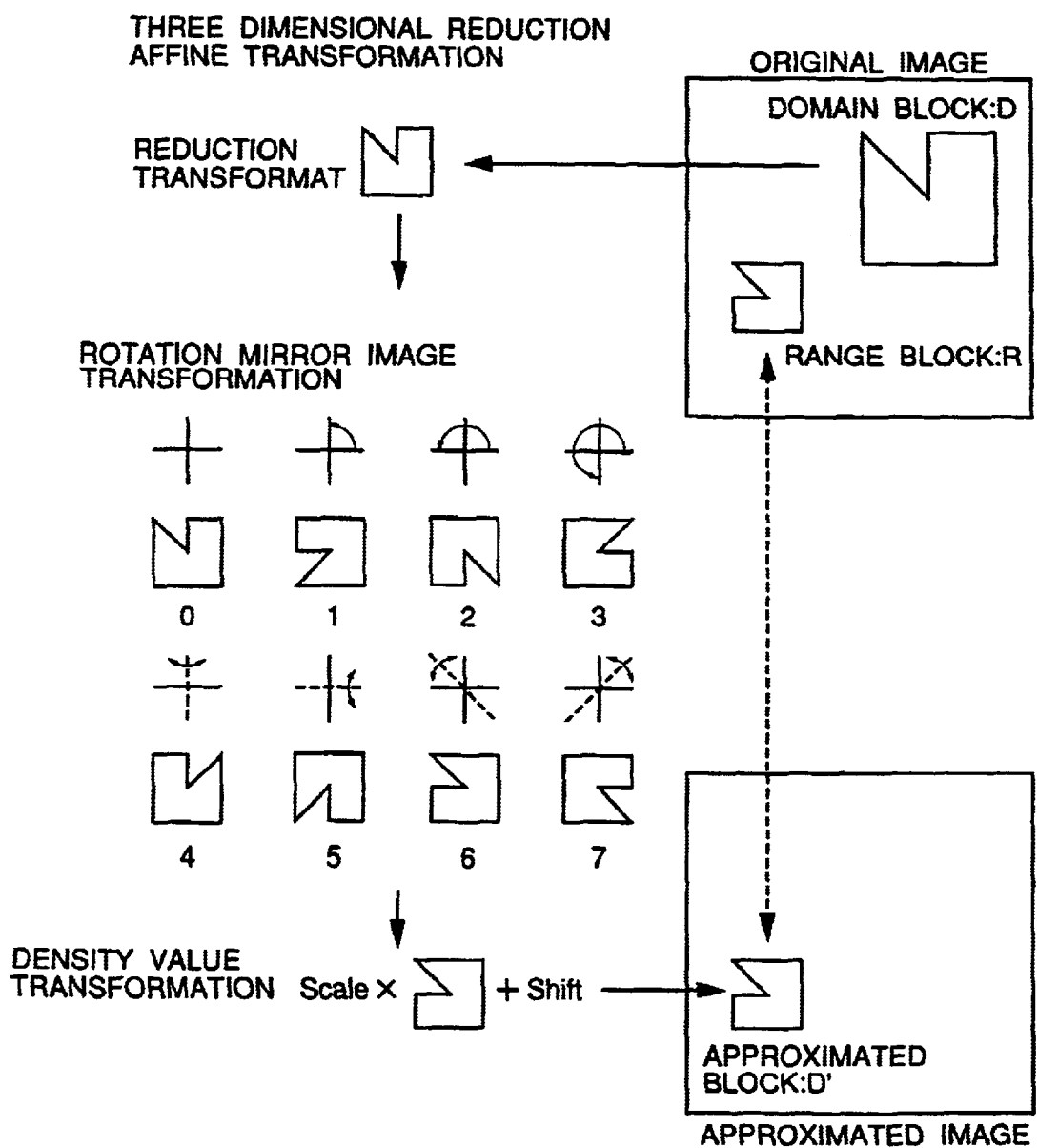
FIG. 1 shows a structure of a three-dimensional affine transformation.

Two improved methods of the fractal compression method aimed to improve the picture quality of the reproduced image will be described hereinafter with reference to the drawings as embodiments of the present invention.

The first method is a fractal image compression method that employs mathematical morphology operation (referred to as MM hereinafter) as the pre-process. According to this method, the image data is divided using MM operation which is one type of nonlinear filtering process into a planar portion of a small density change that is suitable for fractal block coding, and edge information that becomes the cause of picture quality degradation in the reproduced image. The planar portion is compressed by the fractal block coding method, and the edge information is compressed by the reversible compression method to improve the picture quality.

The second method is a fractal image compression method taking into consideration domain block allocation error. According to fractal block coding, the error generated when a range block of interest is approximated by a three-dimensional reduction affine transformation of a domain block that provides the optimum approximation (referred to as "optimum approximation block" hereinafter) is extracted as the error information. The error information is compressed by the reversible compression method to improve the picture quality.

First Embodiment

As a first embodiment of the present invention, the MM theory and the method of dividing an original image into a planar portion image and edge information using MM will be described. Then, the compression method of the planar portion image and edge information will be respectively described. Also, the addition of the planar portion image and edge information at the time of reproduction will also be described.

The process flow of the method of the first embodiment is shown in FIG. 3. Referring to FIG. 3, an original image is prepared. The original image is sent from the external equipment connected in a network and the original image is received by a modem of the image processing apparatus. A MM operation is applied thereon (S1, S2). The MM basic operation employed in sorting the planar portion of the image and the edge information will be described hereinafter. The signs in the following definition comply with Haralick R. M. MM includes two basic operations of the dilation operation (expansion process) and erosion operation (reduction process). The opening operation (expansion process) and the closing operation (reduction process) which are combinations thereof are also often employed.

These four basic operations are defined in the following equations (3)–(6).

Dilation Operation $$f \oplus g = \max_{\substack{(x_1, y_1) \in G \\ (x-x_1, y-y_1) \in F}} \{f(x - x_1, y - y_1) + g(x_1, y_1)\} \quad (3)$$

Erosion Operation $$f \ominus g = \min_{\substack{(x_1, y_1) \in G \\ (x+x_1, y+y_1) \in F}} \{f(x + x_1, y + y_1) - g(x_1, y_1)\} \quad (4)$$

Opening Operation $$f \cdot g = \{f(x,y) \ominus g(x_1, y_1)\} \oplus g(x_1, y_1) \quad (5)$$

Closing Operation $$f \cdot g = \{f(x,y) \oplus g(x_1, y_1)\} \ominus g(x_1, y_1) \quad (6)$$

Setting f(x, y) as the multiple gray level image defined on the plane of the input two-dimensional coordinates, F as a defined region thereof, g(x, y) as the filter function called the structural element, and G as a defined region thereof, the MM operation with respect to the multiple gray level image f(x, y) defined on the two-dimensional coordinate plane is represented by the above equations (3)–(6).

The dilation operation is defined as the maximum value filtering process by a structural element g(x, y) for image f(x, y). This operation provides the indent-fill effect and dilation effect with respect to an image having different densities.

The erosion operation is defined as the minimum value filtering process. It provides the advantage of removing small noise for a multiple gray level image and an image reduction effect.

The opening operation which is a combination thereof serves to remove any protrusion of a range that is smaller in area than the predefined structure element. The closing operation provides the burying effect of an indent portion. It is known that the resultant image differs depending on the structure element. The concept of these operations are shown in FIGS. 4A, 4B, 5A and 5B. It is appreciated from these figures that these two operations have a smoothing effect on the density values.

By the ball filter represented by the following equation (7) as a pre-process on the original image, the closing operation is applied after the opening operation to produce a smoothed image of the original image. Then, the difference between the original image and the smoothed image is computed. This difference is set as the edge image. The concept of this process is shown in FIGS. 4A, 4B, 5A and 5B.

$$g(x, y) = \begin{cases} \sqrt{r^2 - x^2 - y^2} & x^2 + y^2 \le r^2 \\ -\infty & \text{otherwise} \end{cases} \quad (7)$$

Thus, an original image is divided into a smoothed image (FIG. 3, S3) formed of low and middle frequency components, and an edge image (FIG. 3, S4) formed of high frequency components. The smoothed image is an image having the sudden density change in the original image removed, and corresponds to the low frequency components in the original image. The edge image corresponds to the high frequency components. The edge image has a great amount of pixels of density value 0 since the edge information in a natural image is less than the information of the planar portion.

In the present method, for the purpose of improving the compression efficiency of multi-value run length coding, the weak edge information appearing as a low density value in the original edge image is removed by thresholding (S6). The result is set as the true edge information (S8). Considering that the picture quality is not greatly degraded even when fractal coding is applied, the true edge information is achieved by removing the weak edge information from the original edge image. The process is represented by the following equation (8), where f(x, y) is the original edge information, g(x, y) is the true edge image, and θi is an appropriate threshold value.

$$g(x, y) = \begin{cases} f(x, y) & |f(x, y)| \ge \theta i \\ 0 & |f(x, y)| < \theta i \end{cases} \quad (8)$$

The weak edge information discarded as |f(x, y)|<θi in this process corresponds to an edge does not exhibit such a great density difference. It is considered that the picture quality is not greatly degraded even if fractal coding is applied. Therefore, the weak edge information is added to the smoothed image (S5). The resultant image is taken as the image for fractal block coding.

Then, edge information g(x, y) is applied to requantization to reduce the number of gray scale levels (S10) in order to improve the compression efficiency of Huffman coding. This process is represented as the following equation (9), where gmax is the original number of gray scale levels, hmax is the number of gray scale levels after the process, and h(x, y) is the edge information after the process.

$$h(x, y) = \left[ \frac{g(x, y)}{g_{\max}} \times h_{\max} \right] \quad (9)$$

On the edge information subjected to the density transform process of reducing the number of gray scale levels, the two reversible compression methods, i.e. multi-value run length coding (S11) and Huffman coding (S12) are sequentially applied. The multi-value run length coding is a reversible compression method effective for an image that includes many 0 density values. As shown in FIG. 6, the number of pixels having the density value of 0 is counted while raster-scanning the image. The counting operation is suppressed when a pixel having a valid nonzero density value is encountered. The length of the 0 run and the valid density value are recorded as a pair. Then, the frequency of the occurrence of 0 run and the frequency of the occurrence of a valid density value are obtained individually. According to the occurrence frequency, the data subjected to Huffman coding that allocates coding of a variable length is set as the compressed data of the edge information. The data of the weak edge information that was discarded from the above-described edge image when the threshold process by θi was applied and the smoothed image obtained by MM operation are added as the planar portion image (S7). Fractal block coding is applied on this planar portion image (S9).

More specifically, for each range block in the image, the position of the domain block that provides the optimum approximation, the type of the affine transformation, the scale value and the shift value of the density value direction are recorded. Since it is not efficient to apply the fractal block coding method on all the range blocks, the planar image portion is subjected to a simple method. More specifically, when the distribution of the density values in the range block is not more than a constant value of θv, the block is regarded as having a uniform density value.

Therefore, a search for a similar region is not carried out, and only the average density value of the block is recorded. The compressed data includes the fractal code that is the planar portion image applied to coding and the reversible compressed portion corresponding to coded edge information.

Similar to the conventional method, the three-dimensional reduction affine transformation recorded by the fractal code is repeatedly applied on an arbitrary initial image to obtain a reproduced image of the planar portion image. Then, edge information is added to the reproduced planar portion image to obtain a reproduced image with respect to the original image.

Experiment and Assessment

Experiment Condition

The parameters of fractal coding are set forth in the following.

Range block size: 4×4 pixels

Domain block size: 16×16 pixels

Scale value: 0.3~1.0, 0.1 pitch (3 bits)

Shift value: −256~+255, 1 pitch (9 bits)

Threshold value $\theta v$ for determination of uniform block: 25

Number of iterative transforms in reproduction: 25 times

Parameters specific to the method of the present embodiment are set as in the following.

Ball filter radius r: 2

Edge information number of gray scale levels: 64

The bit rate of equation (10) is employed as the basis for representing the compression efficiency. The SNR (Ratio of signal power to coding noise power) of equation (11) is employed to assess the picture quality of the reproduced image. MSE in equation (11) is the mean square error of equation (1).

$$\frac{\text{Bits Rate}}{[\text{Bpp}]} = \frac{\text{Size of Compressed File [bits]}}{\text{Number of Pixels of Original Image [pixels]}} \quad (10)$$

$$SNR[\text{dB}] = 20\log\frac{255}{\sqrt{MSE}} \quad (11)$$

Experiment Using Natural Image

Two multiple gray level images having the density of 256 gray scale levels were used in the experiment. One sheet of the facsimile test chart of the Society of Image Electronics is extracted and decimated to 256×256 pixels as original image 1. As original image 2, one sheet of an image provided by the Japanese Industrial Standard as standard image data SCID (Standard Color Image Data) was used. The image provided by the Japanese Industrial Standard was a color image of RGB. Therefore, the original data was transformed into YCrCb. Then, the multiple gray scale image using only the luminance value data was taken as original image 2. Furthermore, since the image was as large as 2048×2560 pixels, the image was divided into 80 sheets of 256×256 pixels. Each image was compressed independently.

The results of applying compression on original image 1 is shown in FIG. 7. The bit rate is plotted along the abscissa, and SNR is plotted along the ordinate. The threshold value $\theta i$ for weak edge information removal was altered into 9 stages from 8 to 40 in the steps of 4. Each point in the graph shows a transition in order from right to left of the broken line as the value of $\theta i$ is altered from 8 to 40.

It is appreciated from FIG. 7 that the target level of not more than bit rate 2 (Bpp=bit per pixel) and at least SNR35 (dB) is realized at the range where $\theta i$ is from 16 to 28. Therefore, image 2 was subjected to compression with threshold value $\theta i$ set to 16. The number of partial images out of the 80 partial images satisfying the target level is shown in the following Table 1.

TABLE 1

| Determination | Number of Partial Images |
| --- | --- |
| Satisfying target value for both compression efficiency and reproduced picture quality | 37 |
| Satisfying target value for only reproduced picture quality | 11 |
| Satisfying target value for only compression efficiency | 11 |
| Not satisfying target value for both aspects | 20 |

It is appreciated from Table 1 that the number of partial images that satisfy the target values for both aspects of compression efficiency and reproduced picture quality was less than half the total images. In the method of the present embodiment, the compressed data includes both the fractal coded data and reversible compressed data. Difference in the file size in the image appeared mainly in the reversible compressed data. In the partial image where change in the density is great, the amount of information of the reversible compressed data becomes greater to degrade the compression efficiency. This implies that the compression efficiency of the edge information is poor. It is considered that this can be solved by studying a more efficient compression method for edge information. There were few partial images that satisfy only one aspect of the compression efficiency and the reproduced picture quality. Any partial image that has poor compression efficiency also had degraded reproduced picture quality.

Experiment Using Text Image

An experiment was carried out using an image that includes many edge portions of significant change in density. More specifically, a text image corresponding to a document of an image of different densities was used. As original image 3, a text sample from ITU (International Telecommunication Union), test chart No. 2 was taken as an image having 256 gray scale levels at 300 (dpi). The image size was 256×256 pixels (FIG. 8). Since it was considered that the ratio including the edge information will be different depending upon the size of the text character, three images were prepared for the experiment having the text point size of 7.875, 10.5, and 13.75. In a natural image, 256 gray scale levels were used with density value 0 as "black" and density value 255 as "white". In the present experiment, the text image was used having the gray scale level inverted.

Figure 9:
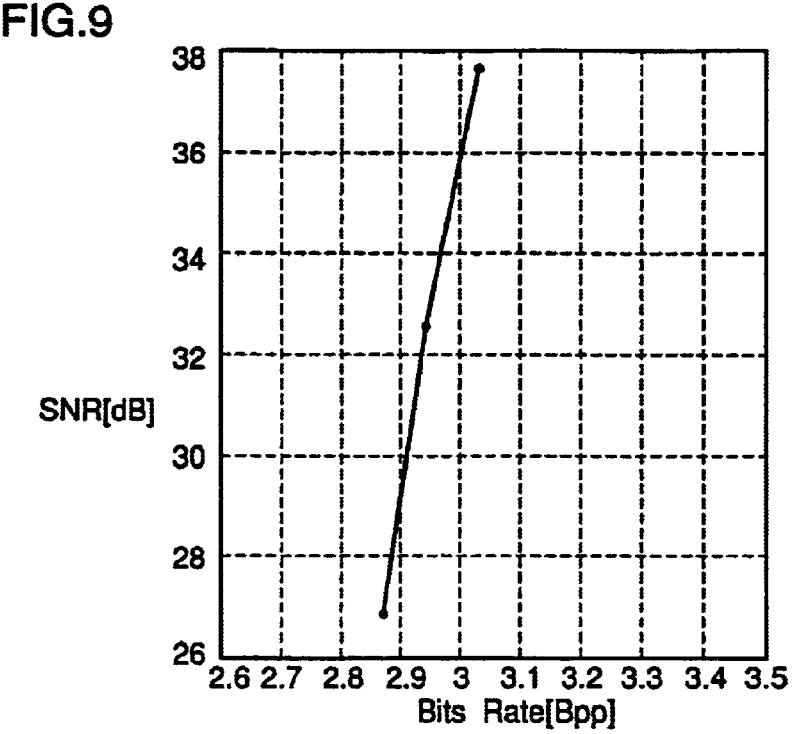
FIG. 9 shows compression efficiency and picture quality of a reproduced text image indicating an advantage of the first embodiment of the present invention.

The result of original image 3 subjected to compression is shown in FIG. 9. The experiment conditions are identical to the experiment for original image 2. The threshold value was $\theta i=16$.

The bit rate and SNR are plotted along the abscissa and the ordinate, respectively, in FIG. 9. It is appreciated from FIG. 9 that the broken line is shifted sequentially downwards as the point size becomes greater. This indicates that a higher picture quality of the reproduced image can be obtained for an image with text characters of small size and that has many edge information. The compression rate does not show a great change even if the size of the text character is altered. It is therefore considered that the present method is effective for an image that includes many edge information such as when the text character size is small. However, this result is contradictory to the result of the experiment using a natural image. This issue will be described afterwards.

Second Embodiment

Figure 10:
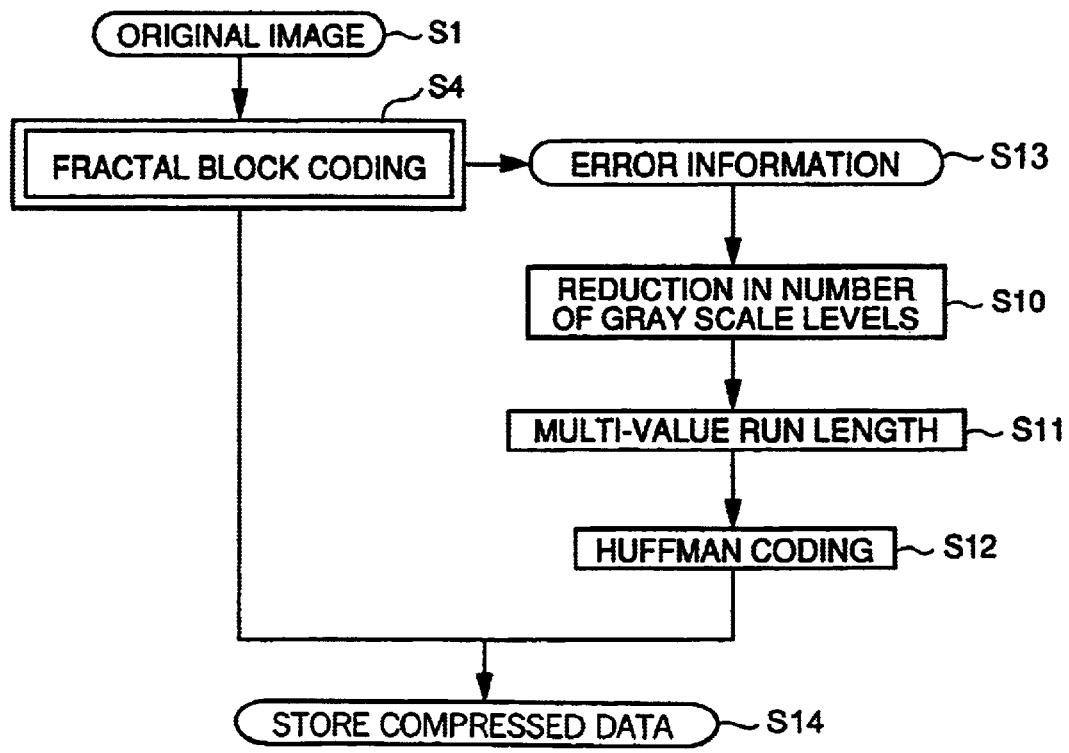
FIG. 10 is a block diagram showing a process of a second embodiment of the present invention.

In the second embodiment of the present invention, the method of extracting error generated by allocation of a domain block as error information will be described. Then, the method of compressing error information and the method of adding the error information in reproduction will be described. The flow of the method of the present embodiment is shown in FIG. 10.

Calculation of Error Information

As described above, a range block is approximated by an approximation block that is a domain block subjected to three-dimensional reduction affine transformation in the method of fractal block coding. The mean square error is employed as a barometer for identifying how much a certain approximation block is close to a range block. This mean square error is used only for selecting the optimum approximation block for one range block.

It is considered that even if a range block is approximated by an optimum approximation block, that range block is not subjected to sufficient approximation if the mean square error is great. This error generated at the stage of approximation is one factor in degrading the picture quality.

In the present embodiment, a certain threshold value $\theta e$ is set for the value of the mean square error. When the mean square error is at least $\theta e$ for one range block approximated with the optimum approximation block, determination is made that sufficient approximation was not carried out for that range block. Then, the difference in the density value between the range block and the approximation block is calculated. The calculated difference is set as the error information of that range block (FIG. 10, S9, S13) and is stored with the fractal coded data when the error amount is greater than the threshold value.

Compression of Error Information

Referring to FIG. 10, the error information has the number of gray scale levels reduced (S10) by equation (9), similar to the above-described edge information compression method. Then, the multi-value run length is calculated (S11). Huffman coding is applied on the information subjected to the multi-value run length process (S12). The error information is set as compressed data (S14).

Simplification of Fractal Compression

Simplification of fractal block coding described above is also used in this method to improve the compression efficiency and search efficiency. More specifically, when the distribution of the density value in the range block is not more than a constant value of $\theta v$, that block is regarded as having a uniform density value. Only the average density value of the block is recorded.

Reproduction of Image

Compressed data is formed of fractal coded data and reversible coded data corresponding to coded error information. In reproducing an image, replacement of the initial image by the three-dimensional reduction affine transformation recorded by fractal code is applied once on the entire image. Then, error information is added. This replacement process and adding process of the error image are repeated alternately to obtain a reproduced image.

Similar to the conventional method, a reproduced image was obtained by repeating only the replacement process for the experiment of the present invention. This image was compared with an image having error information added at the last stage. As a result of the comparison experiment, the method of the present invention showed an improvement in SNR by approximately 1 (dB).

Experiment and Assessment

Experiment Conditions

The parameters of fractral block coding are identical to those described in the first embodiment. The parameters specific to the method of the present embodiment are (1) mean square error threshold value $\theta e$, and (2) the number of gray scale levels of error information.

The bit rate of equation (10) was used as the basis of representing compression efficiency. SNR of equation (11) was employed as assessing the picture quality of the reproduced picture.

Experiment Using Natural Image

Figure 11:
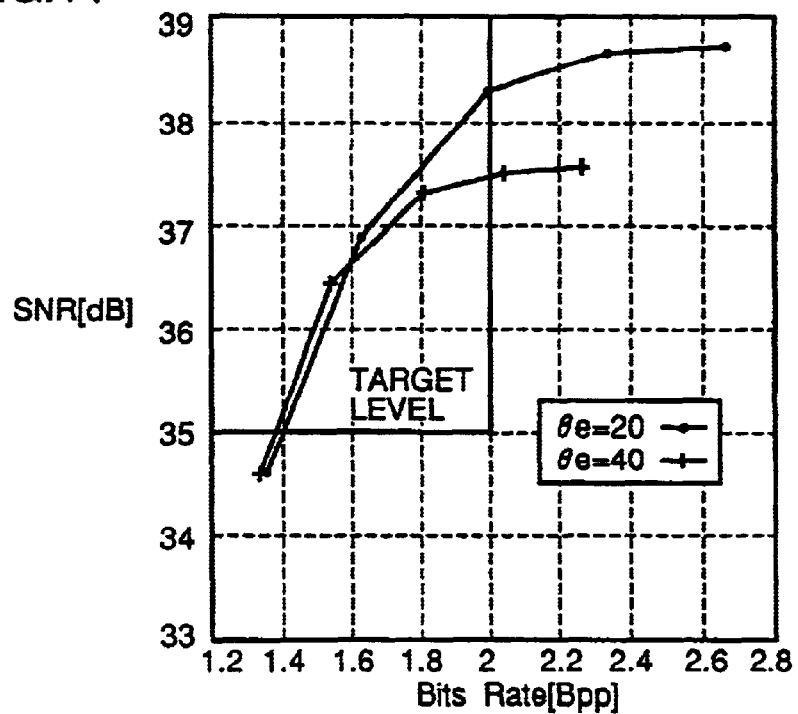
FIG. 11 shows compression efficiency and picture quality of a reproduced natural image indicating an advantage of the second embodiment.

Experiments were carried out using original images identical to those of the first embodiment. The result of applying compression on original image 1 is shown in FIG. 11. The bit rate and SNR are plotted along the abscissa and the ordinate, respectively. The mean square error threshold value $\theta e$ for calculating the error information was set to the two values of 20 and 40. The gray scale level of the error information was altered to the five levels of 16, 32, 64, 128 and 256. The broken line shows a transition from right to left as the gray scale level becomes lower.

It is appreciated from FIG. 11 that the target level of not more than bit rate 2 (Bpp) and at least SNR35 (dB) was realized with the gray scale levels of 32 and 64 for both the threshold values $\theta e$ of 20 and 40. The highest SNR was when $\theta e=20$ and the number of gray scale levels of 64.

Then, compression was applied on original image 2 with the threshold value $\theta e=20$ and the number of gray scale levels of the error information set to 64.

The number of partial images out of the 80 partial images satisfying the target level is shown in Table 2.

TABLE 2

| Determination | Number of Partial Images |
| --- | --- |
| Satisfying target value for both compression efficiency and reproduced picture quality | 46 |
| Satisfying target value for only reproduced picture quality | 34 |
| Satisfying target value for only compression efficiency | 0 |
| Not satisfying target value for both aspects | 0 |

Figure 2:
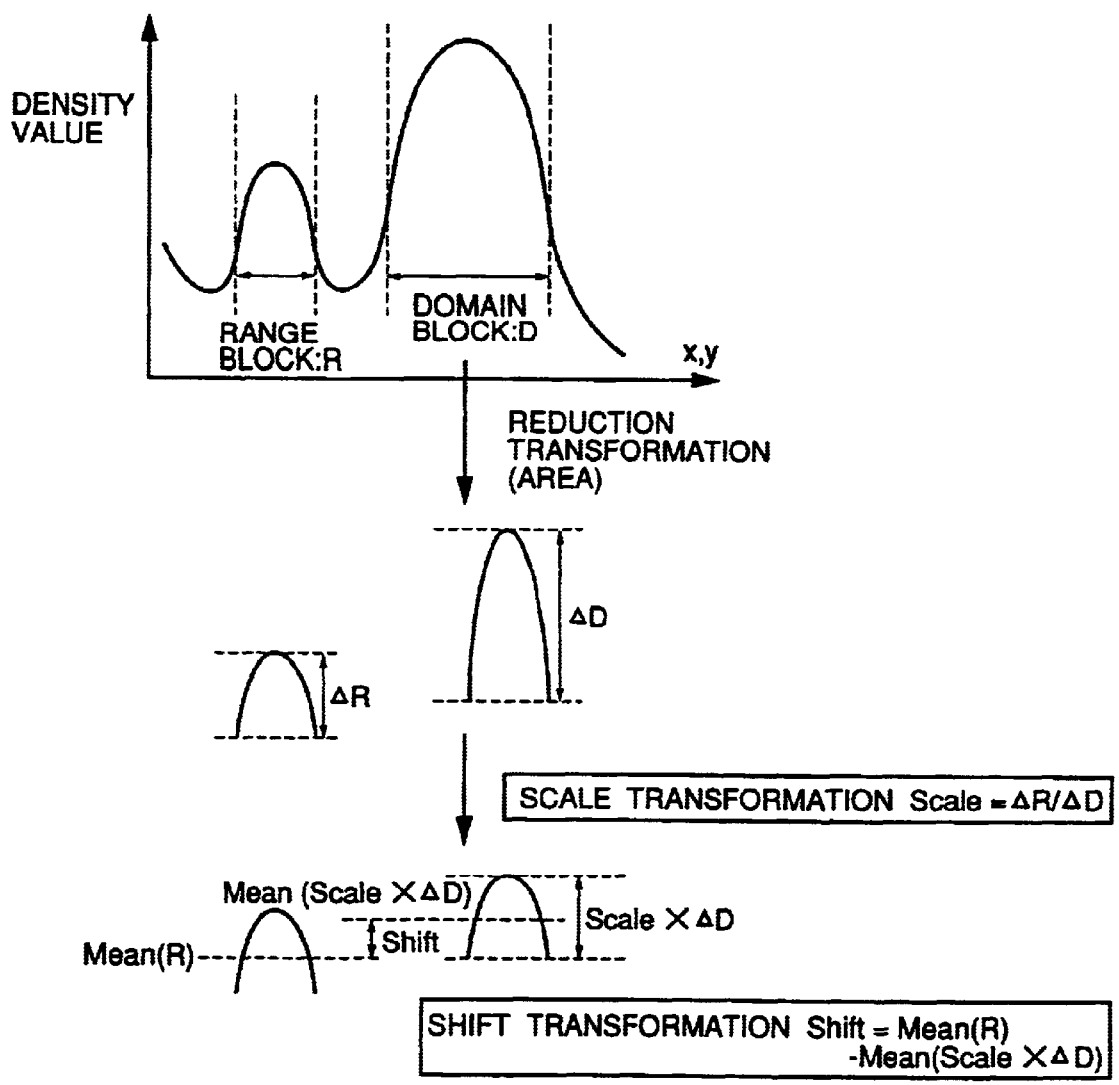
FIG. 2 shows scale transformation and shift transformation.
Figure 4A:
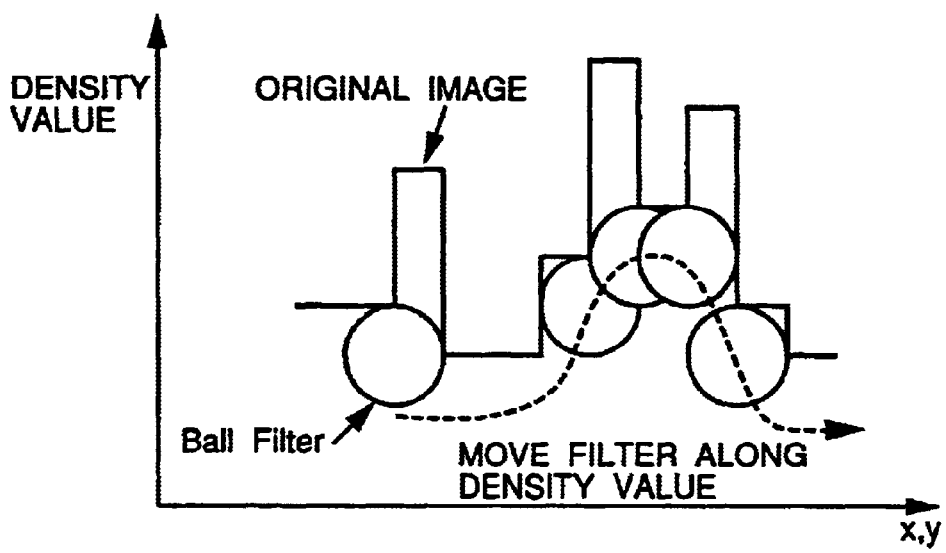
FIGS. 4A and 4B schematically show an opening operation.
Figure 4B:
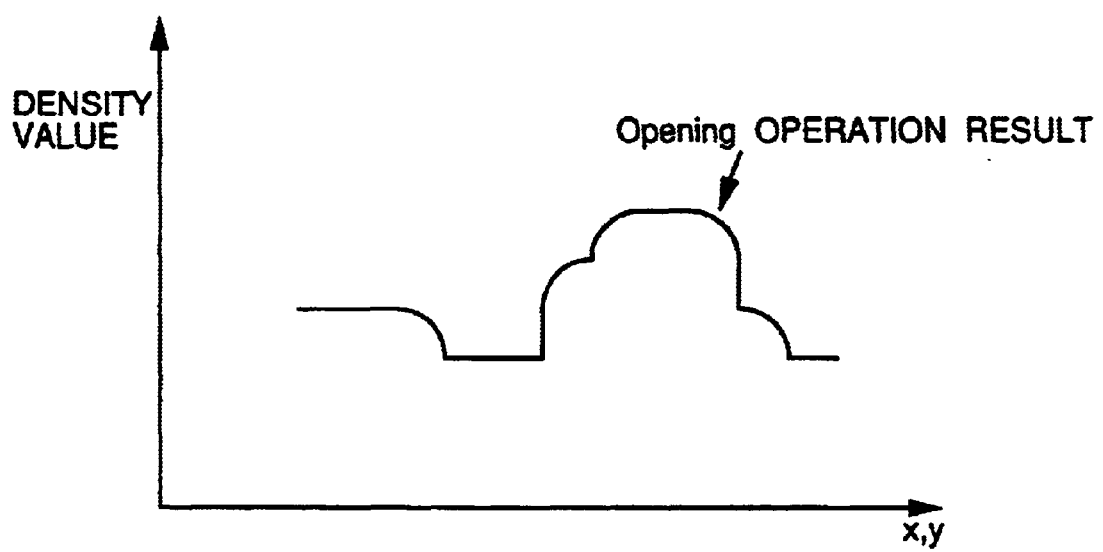
Figure 5A:
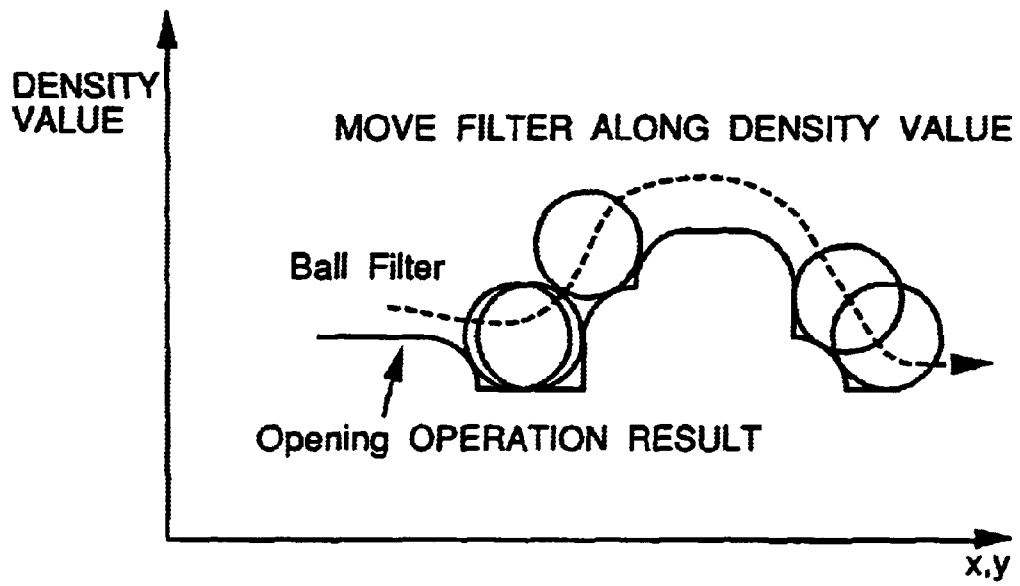
FIGS. 5A and 5B schematically show a closing operation.
Figure 5B:
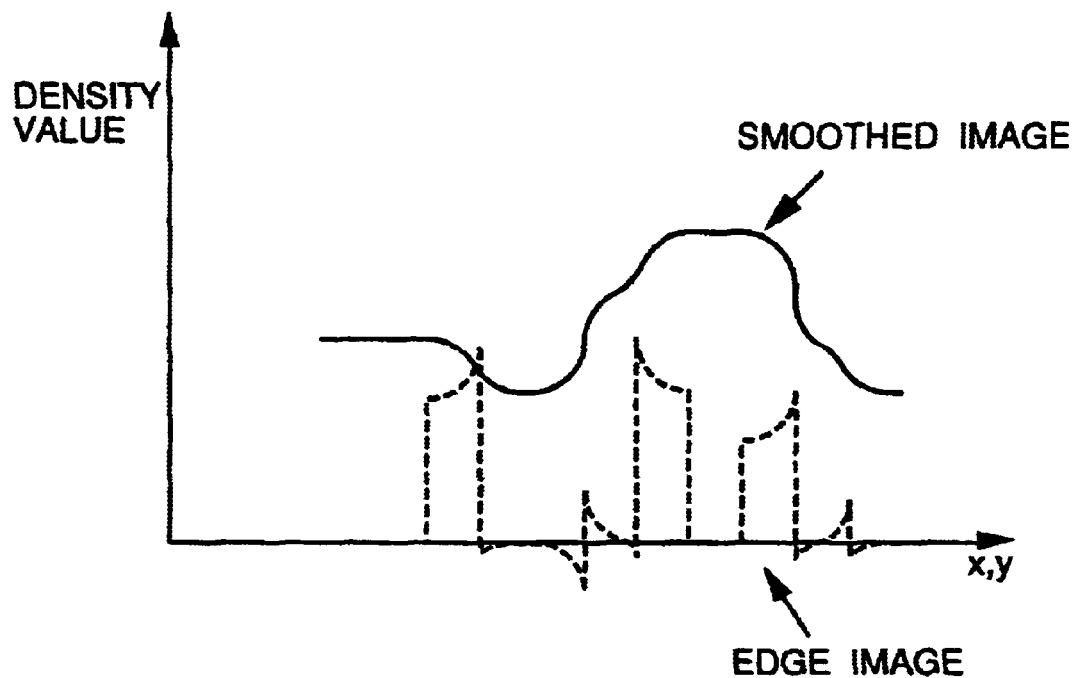

It is appreciated from FIG. 2 that there is no partial image that is below the target level for the aspect of the reproduced picture quality. Sufficient picture quality of the reproduced image was obtained for all partial images. However, approximately 43% of the partial images did not satisfy the target level for the aspect of the compression rate. This is considered to be caused by the compression of the error information carried out similar to the method of compressing edge information. It is considered that this can be solved by studying the feature of error information and employ a compression method suitable for error information.

Experiment Using Text Image

Experiments were carried out using an original image (FIG. 8) similar to those of the previous experiment.

In the preliminary experiment carried out with the number of gray scale levels of the error information set to 64, the bit rate exceeded 4 (Bpp). Therefore, the experiment conditions were set by reducing the number of gray scale levels of error information lower than that for a natural image. $\theta e=20$ was set. Also, the number of gray scale levels of error information was set to 32.

Figure 12:
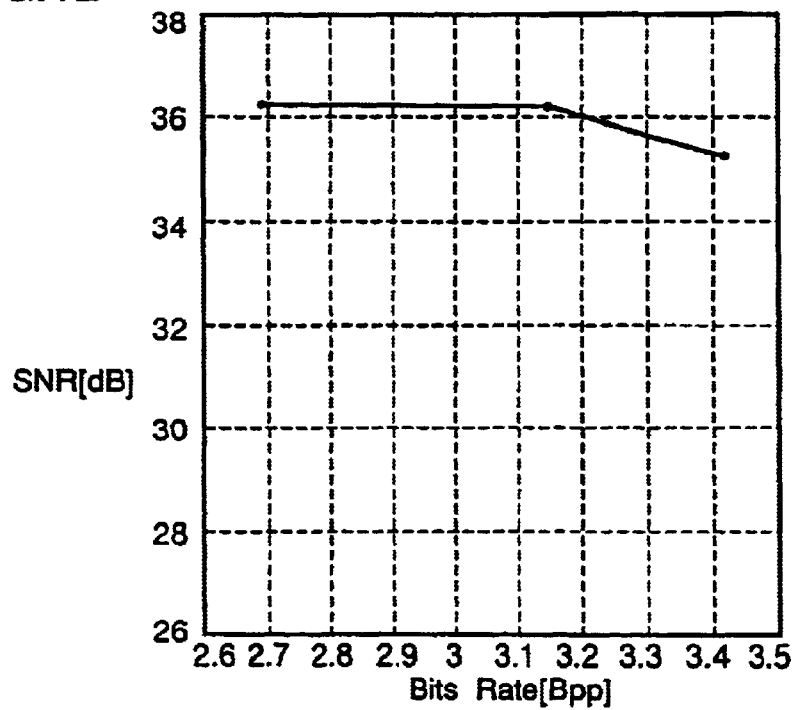
FIG. 12 shows compression efficiency and picture quality of a reproduced text image indicating an advantage of the second embodiment.

The results of applying compression on original image 3 is shown in FIG. 12. The bit rate and the SNR are plotted along the abscissa and the ordinate, respectively. In FIG. 12, the broken line shows a transition from right to left as the point size of the text character becomes greater. It is appreciated that the compression efficiency is degraded whereas the picture quality of the reproduced image was high for an image including many edge information. Thus, it is considered that the compression efficiency is degraded while the reproduced picture quality is high for an image including many edge portions when processed by this method.

Comparison experiments were carried out for the following four methods.

1. Conventional method
2. Method 1 of present invention: A method with MM as a pre-process
3. Method 2 of present invention: Method employing error information
4. Compression by JPEG For fractal coding of 1. to 3., the above-indicated parameters of fractal coding were used.

In compression by JPEG, AdobePhotoshop 2.5J for Macintosh was used. The compression rate was controlled by selecting an option.

For controlling the compression rate of the conventional method, the variance $\theta v$ of the density value that determines the range block as being uniform was altered. The method with MM as a pre-process employed the parameters of a ball filter radius r=2, and the number of gray scale levels of edge information % 64. The threshold value $\theta i$ of weak edge information removal was altered.

The method employing error information had the parameter of mean square error threshold value $\theta e=20$, and variable number of gray scale levels of error information.

Experiment Using Natural Image

Figure 13:
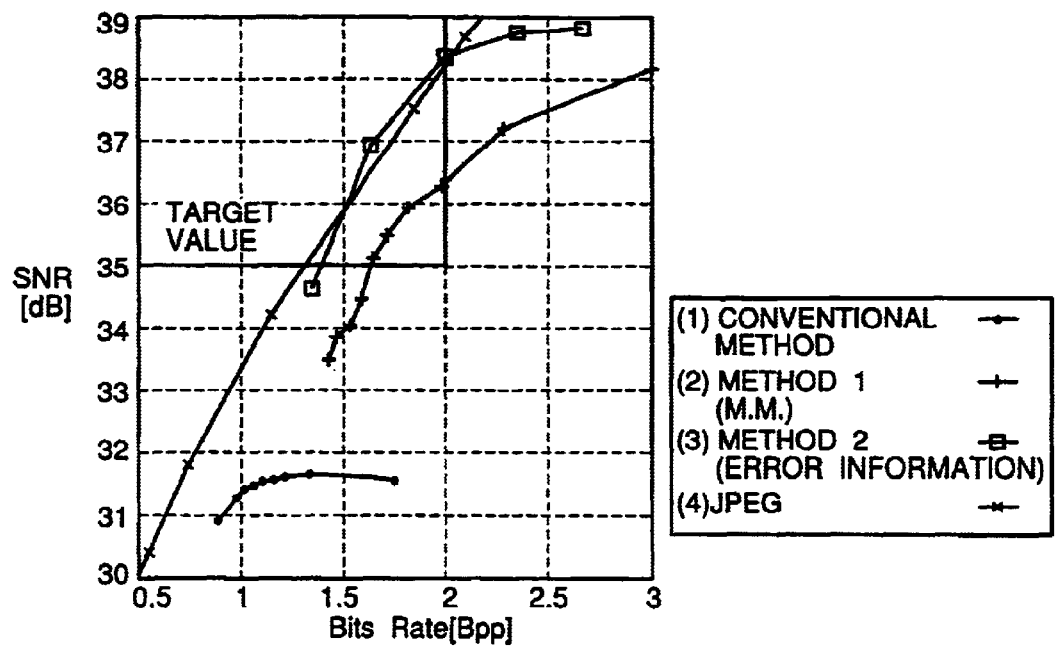
FIG. 13 shows comparison of compression efficiency and reproduced picture quality according to various methods.

Original image 1 was compressed according to the four methods. FIG. 13 shows the relationship between the bit rate and SNR thereof.

It is appreciated from the graph of FIG. 13 that the two methods of the present invention achieved higher picture quality than the conventional method. It was also appreciated that the method employing error information achieved a compression rate and reproduced picture quality equal to those by compression of JPEG.

It is also appreciated that the two methods of the present invention exhibited smaller density difference than that by the conventional method.

In comparison with JPEG, the image by method 1 of the present invention showed small degradation where fine pulsive edges are concentrated such as a region corresponding to the hair. However, it was confirmed that there is degradation in the region where step-like edges are present such as the cheek area. According to method 2 of the present invention, difference in density was smaller even in the step-like edge portions.

Next, original image 2 was compressed according to the four methods. The following Table 3 shows the average value and variance value of the bit rate and SNR by each method for the eighty partial images.

TABLE 3

|  |  | (1) Conventional Method | (2) Method 1 of Present Invention (MM) | (3) Method 2 of present Invention (Error Information) | (4) JPEG |
|---|---|---|---|---|---|
| Bits Rate | Average | 1.03 | 1.83 | 1.98 | 1.70 |
|  | Variance | 0.05 | 0.54 | 0.63 | 0.23 |
| SNR | Average | 29.71 | 35.17 | 38.69 | 39.81 |
|  | Variance | 22.60 | 5.20 | 1.52 | 2.75 |

Comparing method 2 with the conventional method, it is appreciated that the average of SNR is improved. Also, the variance value has become smaller. It can be said that the two methods of the present invention are effective in improving the picture quality and has high versatility. However, in comparison with JPEG, the average value was inferior than the JPEG for both the bit rate and SNR. It can be considered that the two methods of the present invention are compression methods lower in level than JPEG. As to the variance value, the bit rate for the two methods of the present invention had a high value since the amount of information of the reversible compression differs greatly depending on the image to be compressed. In the future, it is necessary to study a reversible compression method of coding error information of the method employing edge information and error information of the method with MM as a pre-process.

As to the bit rate, the two methods of the present invention showed poor compression efficiency in the average value in contrast to those of the conventional method. However, the target level is achieved. Also, the variance value is higher than that of the conventional method. This is because, in the method of the present invention, the fractal coding data and the reversible compression data are both taken as compressed data, and the amount of information of the reversible compressed data differs greatly depending upon the image to be compressed.

As to SNR, the two methods of the present invention both showed an average value higher than that of the conventional method. The target level is achieved. Also, the variance value is smaller than that of the conventional method. Versatility is achieved in the aspect of the picture quality of the reproduced image. Method 2 of the present invention particularly provides a reproduced image of stable and high picture quality with a smaller variance value than that of JPEG.

Experiment Using Text Image

Figure 14:
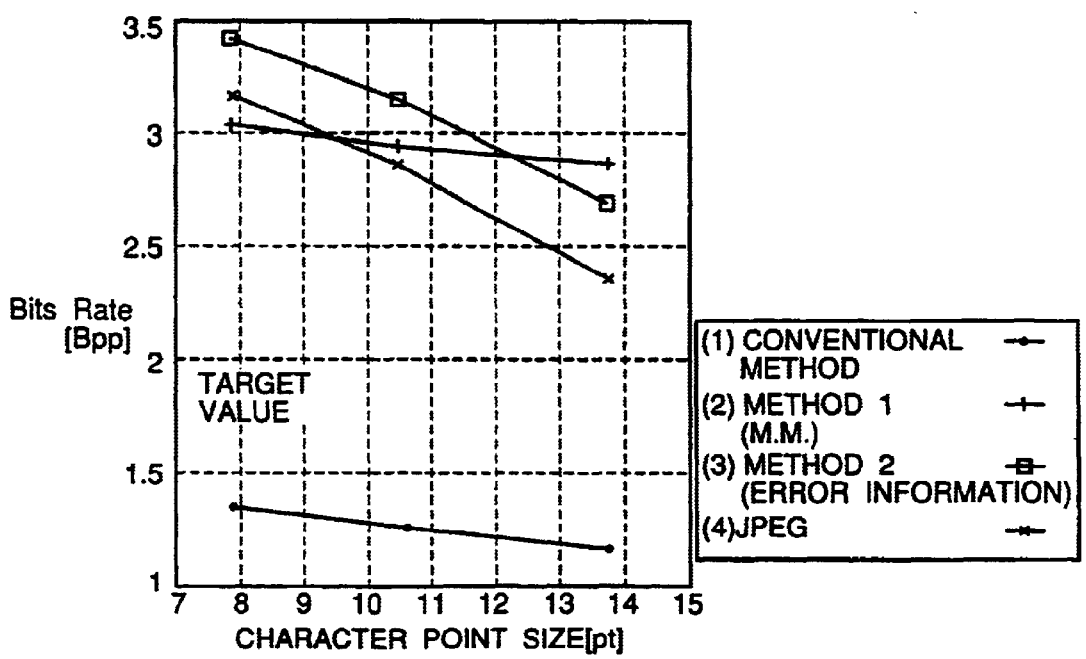
FIG. 14 shows comparison of compression efficiency according to various methods.
Figure 15:
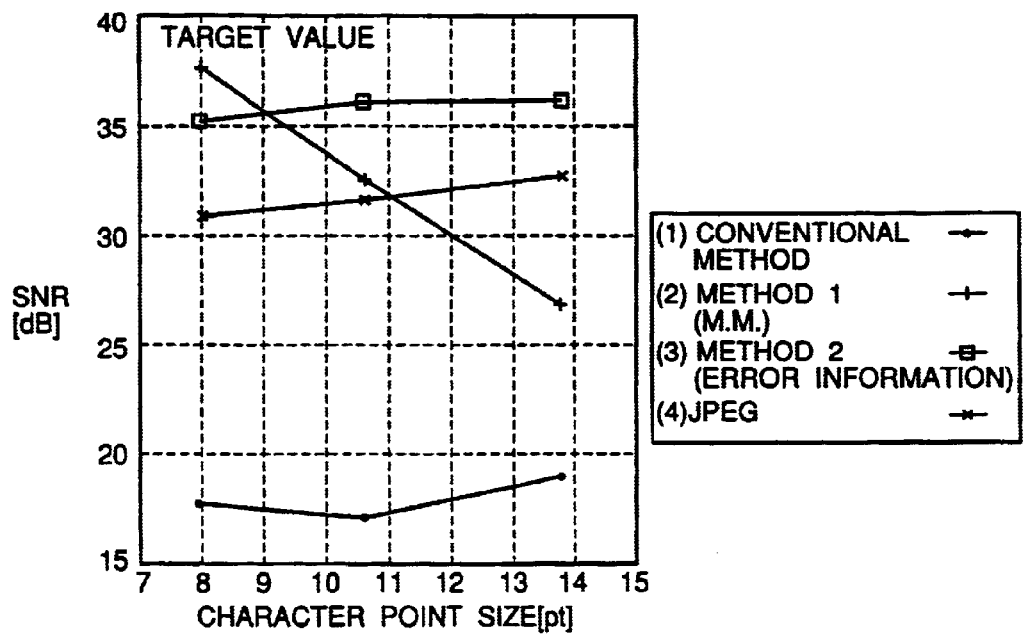
FIG. 15 shows comparison of a reproduced picture quality according to various methods.

The result of carrying out experiments on original image 3 (FIG. 8) according to the four methods are shown in FIGS. 14 and 15. FIG. 14 shows the relationship between the size of the text character and the compression efficiency. The point size is plotted along the abscissa and the bit rate is plotted along the ordinate. FIG. 15 shows the relationship between the text character size and SNR. The point size of the text character is plotted along the abscissa, and SNR is plotted along the ordinate.

It is appreciated from FIG. 14 that the two methods of the present invention do not achieve the target level set for the aspect of compression efficiency. This is because the two methods include data of the reversible code data in addition to the fractal code data. It is necessary to study a compression method for the portion carrying out reversible coding.

It is appreciated from FIG. 14 that the conventional method provides a compression efficiency of a target level whereas the two methods of the present invention do not achieve the target level for the aspect of compression efficiency.

This is because the two methods of the present invention include data of the reversible compression data in addition to the fractal code data. The file size of the reversible compression data becomes larger as the amount of edge information in the image is greater.

As to the picture quality of the reproduced image, degradation is significant in the image by the conventional method as shown in FIG. 15. The SNR shows a low level below 20 (dB). In contrast, the two methods of the present invention has the SNR improved greatly. The object of improving the picture quality of the reproduced image is achieved for an image that includes many edge information such as a text image. Particularly, method 2 of the present invention achieves the target level for all the images of the three different character size.

Comparing compression by JPEG, the image of the smallest text size shows improvement in both the compression rate and picture quality of the reproduced image by method 1 of the present invention. Method 1 is effective for an image that includes many high frequency components such as fine pulsive edges as in text images that cannot be achieved appropriately by JPEG.

However, the value of SNR is suddenly degraded as the text size becomes greater by method 1 of the present invention.

This is considered to be related to the size of the ball filter. In other words, the smoothing effect by the ball filter depends upon the edge configuration.

Figure 16:
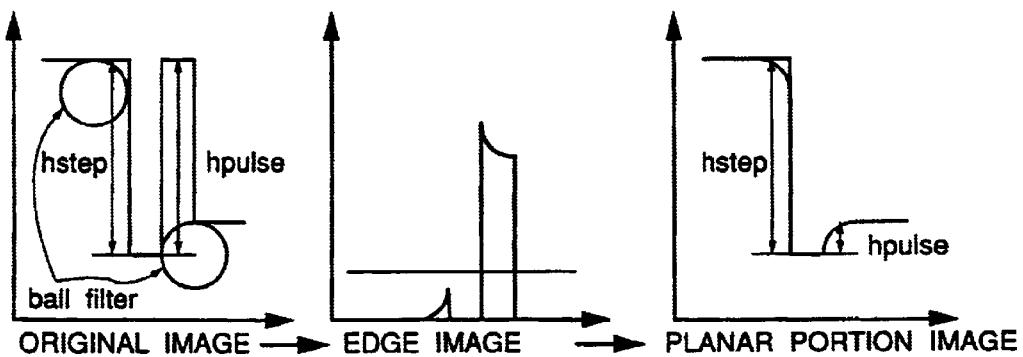
FIG. 16 shows the configuration of a ball filter and an edge.
Figure 17:
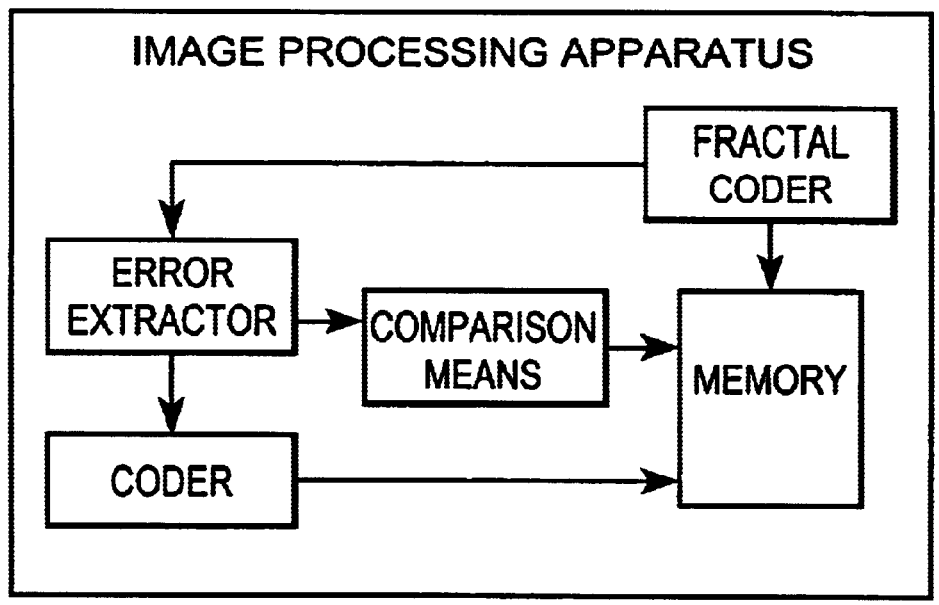
FIG. 17 shows a schematic view of one embodiment of the present invention.
Figure 18:
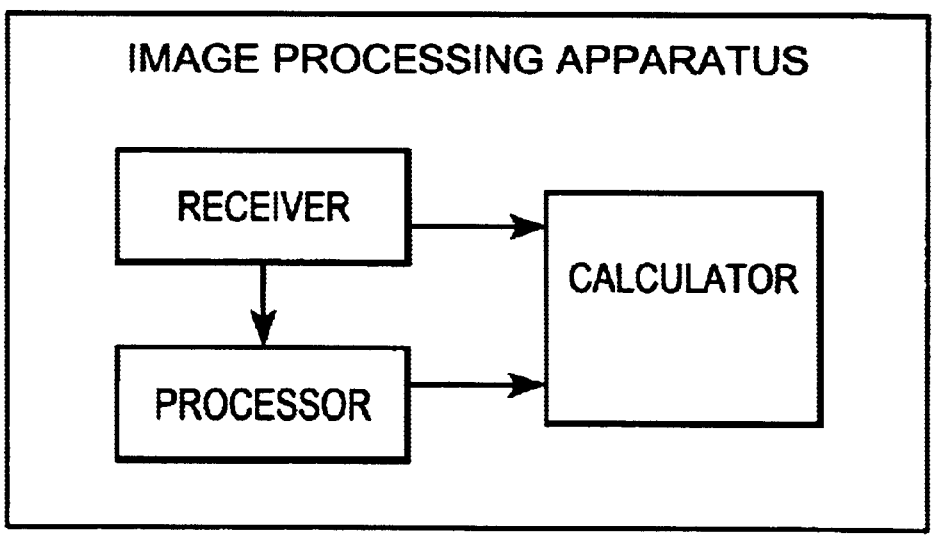
FIG. 18 shows a schematic view of another embodiment of the present invention.

By an additional experiment, it was found that the pulsive edge portion as shown in FIG. 16 where the ball filter cannot fit in, the density difference in the planar portion image which is to be applied to fractal coding becomes smaller by the MM operation and weak edge information removal. However, the density difference in the step-graded edge portion showed no change, indicating that the smoothing effect was not achieved.

More specifically, the edge configuration is pulsive with respect to the ball filter in an image of small text size. Therefore, the smoothing effect is sufficient. However, as the character size becomes greater, the step-graded edge in which the ball filter is fitted becomes greater, so that the smoothing effect is reduced. Therefore, degradation in the picture quality of the reproduced picture occurs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus for coding original image data by a fractal block coding method, comprising:

an extractor for extracting error between blocks determined as having similarity, and a second coder for compressing the extracted error with a second coding method, and a memory for storing the compressed and extracted error with the fractal coded data.

2. The image processing apparatus according to claim 1, further comprising a comparator for comparing an extracted amount of error with a predetermined value, wherein said memory stores the extracted error with the fractal coded data when the error amount is greater than said predetermined value as a result of comparison by said comparator.

3. The image processing apparatus according to claim 1, further comprising an error coder for coding extracted error extracted by said extractor.

4. The image processing apparatus according to claim 3, wherein said error coder uses a reversible coding method.

5. The image processing apparatus according to claim 4, wherein said reversible coder uses a run length coding method.

6. The image processing apparatus according to claim 4, wherein said reversible coder uses a Huffman coding method.

7. The image processing apparatus according to claim 3, further comprising a reducer for reducing the number of gray scale levels of error, wherein said error coder applies a coding process on the error reduced in gray scale level.

8. The image processing apparatus according to claim 2, further comprising an error coder for coding extracted error extracted by said exractor.

9. The image processing apparatus according to claim 8, wherein said error coder uses a reversible coding method.

10. An image processing apparatus comprising:

a receiver for receiving image data, a processor for processing received image data received by said receiver, wherein said processor applies on image data a first reduction process, a first expansion process, a second expansion process and a second reduction process sequentially, and a calculator for determining an edge image in the received image from the processed image data processed by said processor and said received image data, wherein the processor comprises a first coder for coding image data obtained by applying the first reduction process and then the first expansion process on received image data and further applying the second expansion process and then the second reduction process on the processed image data, and the calculator comprises a second coder differing from said first coder for coding said determined edge image.

11. The image processing apparatus according to claim 10, wherein said first coder carries out an irreversible method, and said second coder carries out a reversible method.

12. An image processing method comprising steps of:

coding original image data using a fractal block coding method;

calculating error resulted from the coding step; and storing the calculated error into a memory with the fractal coded data.

13. The image processing method according to claim 12, further comprising a step of comparing the calculated error with a predetermined value, wherein in the storing steps the calculated error is stored into the memory when the calculated error is greater than the predetermined value.

14. The image processing apparatus according to claim 12, further comprising a step of coding the calculated error.

15. The image processing apparatus according to claim 14, wherein the calculated error is coded using a reversible coding method.

16. The image processing apparatus according to claim 15, wherein the reversible coding method is a run length coding method.

17. The image processing apparatus according to claim 15, wherein the reversible coding method is a Huffman coding method.

18. The image processing apparatus according to claim 14, further comprising a step of reducing the number of gray scale levels of error before the coding step.

* * * * *